United States Patent
Tawara

(10) Patent No.: US 6,234,396 B1
(45) Date of Patent: May 22, 2001

(54) OPTICAL PATTERN READING APPARATUS

(75) Inventor: Takao Tawara, Kawaguchi (JP)

(73) Assignee: Opticon, Inc., Orangeburg, NY (US)

( * ) Notice: Subject to any disclaimer, the term of this patent is extended or adjusted under 35 U.S.C. 154(b) by 0 days.

(21) Appl. No.: 08/802,847

(22) Filed: Feb. 19, 1997

(51) Int. Cl.[7] .................................................. G06K 7/10
(52) U.S. Cl. ................................ 235/472.01; 235/462.36
(58) Field of Search .................................. 235/462, 467, 235/466, 472, 462.24, 462.36, 462.41, 472.01, 472.02

(56) References Cited

U.S. PATENT DOCUMENTS

| | | | |
|---|---|---|---|
| 4,251,798 | * 2/1981 | Swartz et al. | 340/146.3 |
| 4,387,297 | * 6/1983 | Swartz et al. | 235/462 |
| 4,578,571 | * 3/1986 | Williams | 235/472 |
| 4,808,804 | * 2/1989 | Krichever et al. | 235/462 |
| 5,059,779 | * 10/1991 | Krichever et al. | 235/467 |
| 5,206,491 | * 4/1993 | Katoh et al. | 235/467 |
| 5,308,966 | * 5/1994 | Danielson et al. | 235/472 |
| 5,329,103 | * 7/1994 | Rando | 235/462.01 |
| 5,354,977 | * 10/1994 | Roustaei | 235/472 |
| 5,410,141 | * 4/1995 | Koenck et al. | 235/472 |
| 5,521,367 | * 5/1996 | Bard et al. | 235/462 |
| 5,572,008 | * 11/1996 | Sakai et al. | 235/467 |
| 5,602,379 | * 2/1997 | Uchimura et al. | 235/472 |
| 5,621,371 | * 4/1997 | Dvorkis et al. | 235/462 |
| 5,640,001 | * 6/1997 | Danielson et al. | 235/472 |
| 5,703,348 | * 12/1997 | Suzuki et al. | 235/472 |
| 5,757,518 | * 5/1998 | Kashitani | 358/474 |
| 5,767,494 | * 6/1998 | Matsueda et al. | 235/454 |
| 5,818,528 | * 10/1998 | Roth et al. | 348/364 |
| 5,859,418 | * 1/1999 | Li et al. | 235/472 |
| 5,959,283 | * 9/1999 | Tawara et al. | 235/462.01 |

\* cited by examiner

Primary Examiner—Thien M. Le
Assistant Examiner—Daniel Stcyr
(74) Attorney, Agent, or Firm—Henry I. Schanzer

(57) ABSTRACT

An optical reading apparatus includes means for moving a mirror in a back and forth motion such that the mirror scans the light reflected from an optical pattern and sequentially projects narrow segments of the reflected image onto a linear image sensor. The means for moving the mirror include a cantilever-like arm or plate having one end held stationary and the other end free to move. The mirror is connected to the end of the arm which is free to move. Selectively enabled driving means coupled to the arm causes it to vibrate and the mirror to sweep or scan across the reflected image of an optical pattern. As the mirror sweeps across the reflected image of the optical pattern it sequentially projects different segments of the optical pattern onto the linear image sensor until the entire optical pattern is projected onto the linear image sensor. The linear image sensor is operable at a high rate of speed and is sufficiently sensitive that it can sense numerous (e.g., 50, or more) segments of the reflected image during one sweep of the mirror. The image sensor may be a solid state device having a large number of photosensitive elements formed along a row.

20 Claims, 6 Drawing Sheets

OPTICAL PATTERN READING APPARATUS

BACKGROUND OF THE INVENTION

This invention relates to means for reading an optical pattern containing one-dimensional or multi-dimensional characters.

Known optical reading equipment is used to read optical patterns by projecting a light onto the optical pattern. A light image reflected from the optical pattern is then projected onto an electronic scan type sensor, such as a photodetector, which converts the reflected light image into an electronic analog signal. The analog signal is then processed to read and recognize the optical pattern information.

A common optical pattern to be read is a barcode, comprised, typically, of a row of parallel stripes which may be, for example, black and white stripes of different shapes and with different spacing. However, use of optical reading apparatus is expanding in many fields, including, for example, various fields such as factory-automation, distribution channel, service system, etc. Furthermore, the volume of information to be recorded, read and processed is ever increasing. The increase in the information makes it difficult, if not impossible, to include the needed information in one row of a barcode. Therefore, it is now desirable to be able to read multi-row barcodes, 2-dimensional barcodes, letters, characters, and other high density codes.

Multi-dimensional information codes and symbols may be read by a scanner such as a TV camera system illustrated in FIG. 7. The TV camera system scanner in FIG. 7 includes a TV camera (21), an image processor (22) and a TV monitor (23). The image processor (22) is connected to a host computer (not shown) via a communication RS-232C line. In this kind of system an information label (24) is set to face the TV camera (21) and may be photographed by the TV camera (21) under normal room light illumination, and the photographed image is processed and converted by the image processor (22) and transmitted to the host computer. On the other hand, the data of the photographed image may also be displayed on a TV monitor (23) via a connecting cable.

Some problems associated with the prior art include the following: First, the TV camera (21), the image processor (22) and the TV monitor (23), etc. are expensive pieces of equipment. Second, a certain length of time is needed to prepare and focus the TV camera (21) to enable it to comply with the room illumination brightness. Third, a 2-dimensional area sensor, that converts the image of the TV camera (21) photoelectrically, has a limited effective number of pixels in the horizontal and vertical directions (e.g., 576H×485V). This limits the resolution capacity of the reading. In this respect the resolution capacity is meant for a minimum line width of a readable information pattern. Fourth, the reading apparatus, repeating the rotation of a mirror in such a function as stop-rotation-stop, is slower in its reading speed and its improvement is fundamentally difficult.

It is an object of the present invention to overcome problems associated with the prior art discussed above.

It is another object of the invention to use a line image sensor and to effectuate a high speed, two-dimensional, reading of an optical pattern by cyclically varying and moving the angle and/or the position of a movable reflecting mirror.

It is still another object of the invention to enable the accurate reading in a very short time of a "one-row" barcode as well as multi-row barcodes, 2-dimensional barcodes, letters and characters.

It is another object of the invention to enable the easy and accurate position setting and support of the reading apparatus and the aiming of the apparatus toward an object to be read.

It is another object of the invention to make use of a line image sensor having a large number of pixels arranged in a row to enable the reading of an optical pattern with greater resolution than can be done with conventional reading method by a TV camera.

Another object of the invention is to achieve fast reading of an optical pattern by the repeated back and forth movement and/or vibration of a movable reflecting mirror without a move-and-stop function.

Another object of the invention is to provide optical reading apparatus which is smaller in size, lighter in weight and less costly to manufacture than the prior art apparatus and which includes simplified and energy-saving means for providing swinging and/or vibratory motion.

SUMMARY OF THE INVENTION

An optical reading apparatus embodying the invention includes a housing with a light source located within the housing arranged for illuminating an optical pattern located externally to the housing. A linear, one-dimensional, image sensor is mounted within the housing. A movable mirror means located within the housing is arranged to receive light reflected from an optical pattern and to sequentially scan, one segment at a time, the entire area of the optical pattern. As the movable mirror means scans or sweeps across the optical pattern image it sequentially projects different narrow rectangular portions of the optical pattern area onto the linear image sensor until light reflected from the entire optical pattern area is projected onto the image sensor.

In a particular embodiment of the invention, the image sensor is a high density solid state charge coupled device (CCD) having a large number of pixels formed along one row.

In a particular embodiment of the invention, the movable mirror means is mounted on a vibrating cantilever-like arm or plate to receive light reflected from the optical pattern and for translating the reflected light and sequentially projecting a narrow rectangular portion of the reflected optical pattern onto the linear image sensor.

In a system embodying the invention, the movable mirror means may include an arm having one end which is held fixed (stationary or immobile) and having another end which is free to vibrate like a springboard. A mirror means is attached to the free end of the arm with the movable means including means for causing the arm and the mirror attached to it to move and vibrate in a perpendicular plane to the length of the arm.

In a particular embodiment, the arm is flexible so that it bends as it moves and vibrates, whereby the movable mirror undergoes movement and rotation.

Driving means may be coupled to the arm (or plate or board) to cause it to swing back and forth or up and down within a linear/perpendicular plane. A reflecting mirror connected to the free end of the arm moves cyclically together with the free end of the arm within a linear/perpendicular plane following the cyclical bending movement of the vibrating arm.

As to light reflected from the optical pattern and projected onto the movable mirror, an optical arrangement may be used to collect the light reflected from the movable mirror and to project it via the optical arrangement onto the linear image sensor.

The output signals of the linear image sensor may be applied to signal processing circuitry which is, in turn, connected to a memory and decoding circuitry.

It should be noted that imparting a cyclical bending vibratory motion to the arm causes a reflecting mirror connected thereto to cyclically change angle and position, which in turn produces a scan pattern of parallel lines of approximately equal spacing from the optical pattern being read and which parallel lines are then projected onto the linear image sensor.

The light source illuminating the optical pattern is located outside of the reflected light path so as not to interfere with the light reflected from the optical pattern which is to be projected onto the linear image sensor.

Optical reading apparatus embodying the invention may include a first fixed (stationary or immobile) reflecting mirror located within the housing and arranged to direct light reflected from the optical pattern onto the movable mirror means. The apparatus may include a second fixed (stationary or immobile) reflecting mirror arranged to receive a light image from the movable reflecting mirror and for directing the light reflected from the movable reflecting mirror via a light condensing optic arrangement onto the linear image sensor, one scan line at a time.

In other embodiments of the invention, the movable mirror may be vibrated or moved by other means than a vibrating arm, board or plate.

BRIEF DESCRIPTION OF THE DRAWINGS

In the accompanying drawing like reference characters denote like components.

FIG. 6(*b*) is a side view of the optical reader of FIG. 6(*a*) and

DETAILED DESCRIPTION OF THE INVENTION

Figure 1:
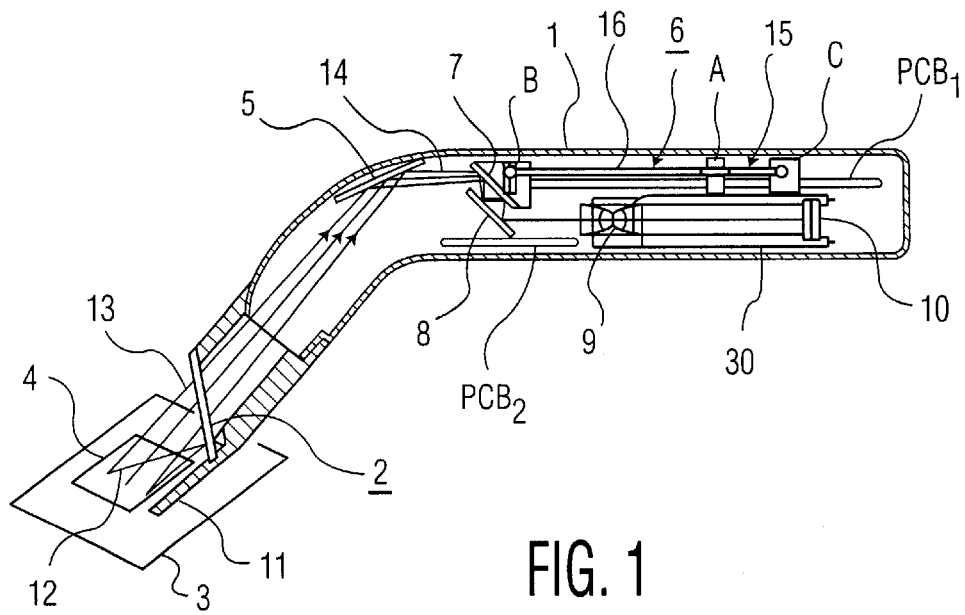
FIG. 1 is a cut away side view of an optical reading apparatus embodying the invention.
Figure 1B:
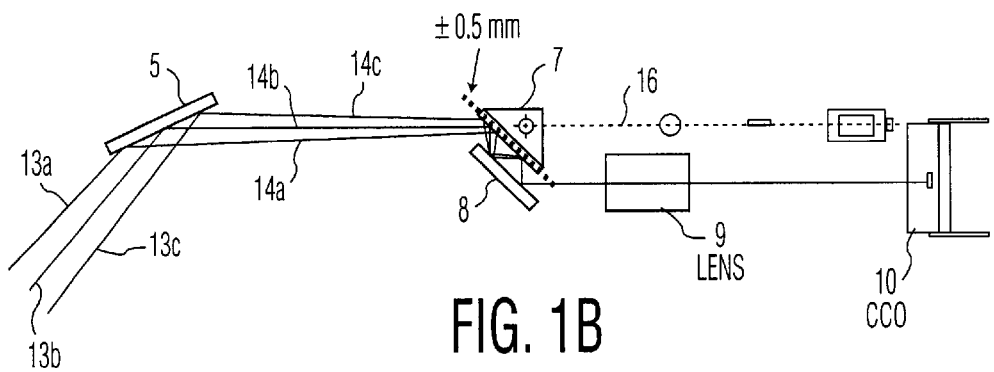
FIG. 1B is an enlarged illustrative diagram of the reflected light path of FIG. 1.
Figure 1C:
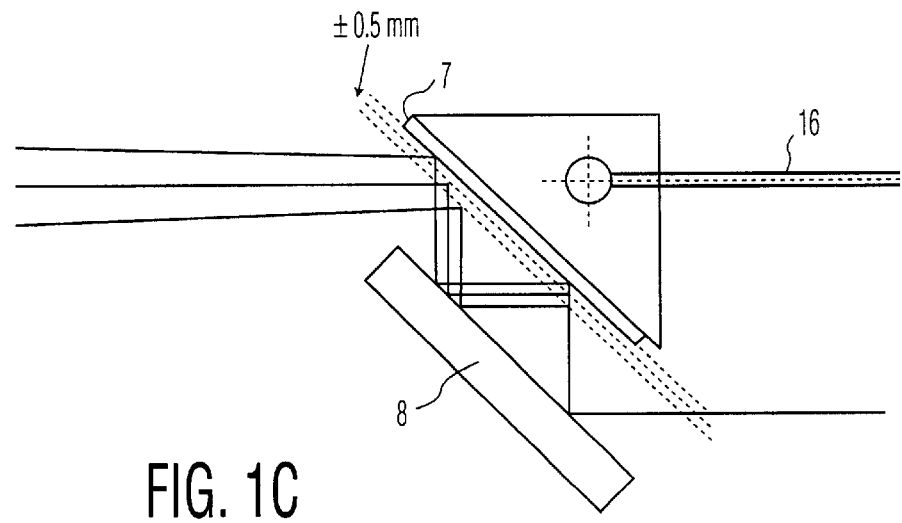
FIGS. 1C and 1D are still further enlarged diagrams of the portion of FIG. 1B illustrating movement of the movable mirror.
Figure 1D:
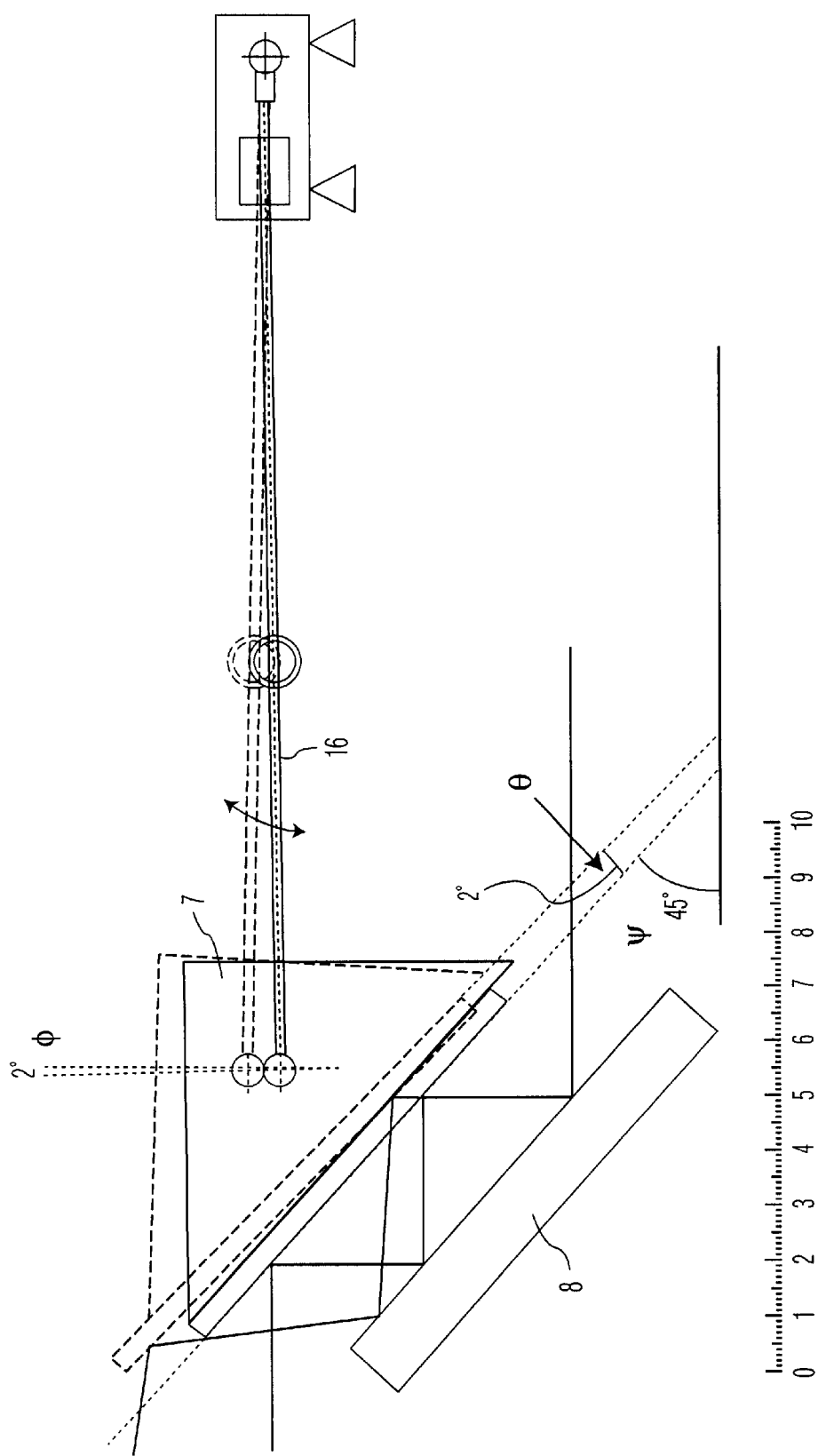
Figure 2:
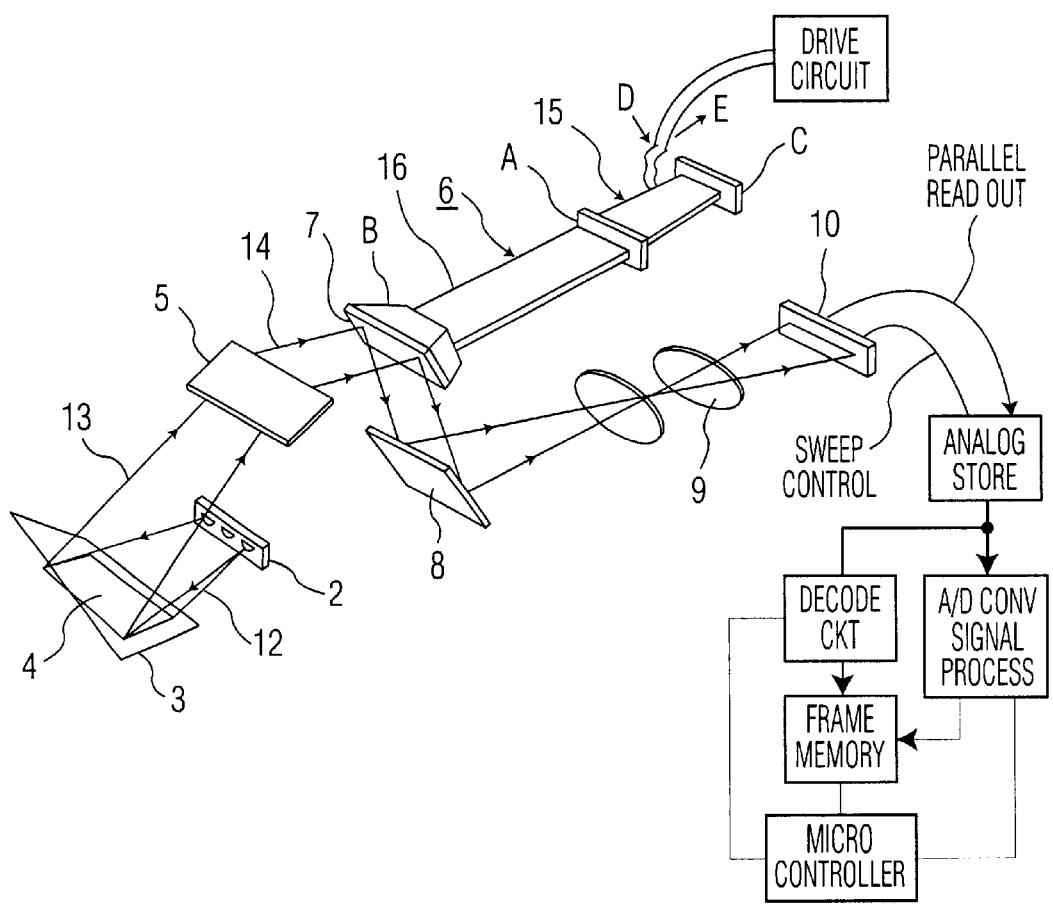
FIG. 2 is a diagram of elements included in an optical reading system embodying the invention.

Referring to FIGS. 1 and 2, there is shown a housing 1 which can be easily held in one hand in which is located a light projection means 2 which includes a plurality of individual light sources such as light emitting diodes (LEDs). In this embodiment these light sources are arranged linearly(along a row) and are positioned to project light onto an optical pattern 4, which may also be illuminated by ambient light. Illuminating light (12) projected from light sources 2 and ambient light incident on the optical pattern 4 are reflectively scattered by the optical pattern 4. The light sources 2 are located so as not to interfere with light reflected from the optical pattern 4. Light (13) reflected from the optical pattern 4 enters into and inside the housing 1 through a light port. The reflected light 13 is reflectively deflected by a fixed (stationary) reflecting mirror 5 and becomes a re-reflected light 14. The re-reflected light 14 is projected onto a movable reflecting mirror (7) which is arranged to receive light from the fixed reflecting mirror 5. The movable reflecting mirror 7 is attached to a flexible movable arm (springboard or plate) 16. The movable mirror 7 and plate 16 are part of an assembly 6 which includes a drive means 15 coupled to the plate 16 for causing the movable mirror 7 to swing up and down. The movable reflecting mirror 7 projects the re-reflected light image onto a secondary fixed reflecting mirror 8 which then projects the re-reflected light via a light condensing optic system 9 onto a linear image sensor 10. The light condensing optic system 9 is comprised, by way of example, of an assembly which includes an aperture and a lens, or an assembly which includes two lenses with an aperture located between the two lenses. The image sensor 10 is an electronic scan type one-dimensional image sensor array, also referred to herein as a "linear" array (as opposed to a "matrix" array) which is arranged to receive the re-reflected light projected via the condensing optic system 9. The linear (one-dimensional) image sensor 10 may be a charge coupled device (CCD) consisting of a large number of pixels; where each pixel is a photo sensing element. The number of pixels in a presently available linear image sensor may be, typically, 2,048. However, linear image sensors with 5,000 or more pixels are being made and will be available in the near future. Large linear arrays will be available for use well before any matrix arrays of like density (along any row) are available and at a much lower price. It is therefore important to be able to use linear sensors to perform a linear or a multi-dimensional sensing. The one-dimensional CCD functions to receive photoelectric signals and to convert these photo signals to electric signals which can be scanned and read out. The light image (a light input signal) reflected from an optical pattern onto the linear light condensing plane of the one-dimensional CCD array may be sampled in a variety of known arrangements.

Each sampled value of the reflected image on each pixel is converted to a signal electric charge and stored in an appropriate location and after an electric charging time it is transmitted to a CCD register by a photogate, all pixels are read-out in parallel, at the same time. The signal electric charges developed in a row of the CCD register are converted to a corresponding row of the sampled value on the time axis (a value of voltage or current), i.e. an electric analog signal, A one-dimensional linear CCD array having pixels with a width ranging between approximately 7 microns and 14 microns is currently obtainable. If the width of each pixel is assumed to be 14 microns, the length of a line image sensor may be approximately 28 mm (i.e., 14 microns×2,048 pixels). The resolution capacity obtainable with a 2048 linear array is approximately 4 times the resolution obtainable with an area matrix sensor of a TV camera of the type discussed above. The height of the pixels in the one-dimensional array may be 200 microns. But, to read multi-dimensional codes, words and characters, etc., it is preferable to reduce the height in order to enhance the resolution capacity in the perpendicular direction.

In the embodiment of FIGS. 1 and 2 it is preferable to use pixels of approximately 4 microns in height. This permits the use of a smaller sized lens for the optic assembly 9 which is designed to project the re-reflected light 14 to extend across a width of 28 mm. The time to perform a scan of a presently available single line image sensor of 2048 pixels is approximately 100 microseconds. But, it is expected that linear images scanners which can be read out in less than 50 microseconds will soon be available. Although the invention is illustrated using CCD sensors, MOS type imagers may be used instead for the electric scan type line image sensor (10).

A signal processing circuit is connected to the output terminal of the line image sensor 10, and a memory and a decode circuit are connected to the signal processing circuit. The signal processing circuit includes logarithmic amplifying circuitry as well as linear amplifying circuitry and other circuits, such as slice circuitry, to perform signal processing functions. The logarithmic amplifying circuitry make use of logarithmic characteristics to expand an input signal level if it is smaller, and to compress it if it is larger. Slice circuitry located within the signal processing circuit processes an input electric analog signal such as a barcode signal and, for example, converts the electric analog signal of a black pattern signal to a logic-one ("1") level and converts the electric analog signal of a white pattern to a logic-zero ("0") level, or vice versa.

The memory circuit may include a frame memory array having "m"-rows and "n"-columns or lines. The number "m" being determined by the number of scan lines, for instance 50, and the number "n" being determined by the number of pixels, for instance 2,048 of the image sensor 10. Where more than one bit is required to be stored for each pixel of information, the frame memory may be increased correspondingly.

The decode circuitry includes a micro-computer containing known algorithms to read/sense and recognize/extract one-row barcodes, two-dimensional codes, letters and characters. The decode circuitry may be mounted on a printed circuit board containing the signal processing and memory circuitry within the housing. Alternatively, it may be arranged partly, or entirely, outside the housing 1.

The optical reader includes a unit case 30 to hold the optics assembly 9 and the image sensor 10 in a fixed relationship relative to each other. Case 30 is comprised of a top plate and a bottom plate which are connected to each other via a right side plate and a left side plate. The top plate and the bottom plate are of the same shape. The width of each plate is wider at the middle than the left entrance port side and the right deep area inside.

The light condensing optic assembly 9 is located at the entrance port of unit 30 and the line image sensor 10 is located at the rear. The middle area, in between, is a light path. The size of the entrance port is determined by the diameter of the optic assembly 9, for instance, 10×10 mm, and the size of the rear area inside unit 30 is determined primarily by the outside dimension of the line image sensor 10, for example 10×40 mm.

FIG. 1 shows first and second printed circuit boards, PCB1 and PCB2, respectively. PCB 1 may be arranged at the upper part of the top plate of unit 30, and PCB2 may be place above the bottom wall of the housing 1. All, or part, of the signal processing circuit and the decode circuit may be mounted on the printed circuit boards. The decode circuitry may be located within, or outside, the housing 1.

The housing 1 includes a guide 11 to determine the location of the optical pattern to be read. Guide 11 may be in the shape of a plane or 2-tine fork. It is arranged at the top end of the housing 1 and extends slantingly downward as illustrated in FIGS. 1 and 6. By placing the top end of guide 11 in a preferred position on the medium to be read 3 and holding it on the medium as illustrated in FIG. 1, the housing 1 may be held accurately and securely at the correct desired position during an entire read cycle.

The movable mirror means 6 includes movable reflecting mirror 7 and a drive means 15 for causing a swing like (back and forth) movement. The drive means 15 for swing movement comprises a flexible vibration plate 16 and a vibration plate driving circuit (not shown) to actuate the mechanical vibration of the plate 16. A pair of electric driving terminals are formed on plate 16 to which a drive voltage is applied.

In a first embodiment, one end of plate 16 is, as illustrated at the right hand side of FIG. 1, mounted on the upper surface of unit 30 through a fixing component (C), and the other end of plate 16, as illustrated at the left hand side of FIG. 1, is connected to the back plane of the reflecting mirror 7 through a bracket (B). Near the fixed end of the plate 16 there is provided a supporting component (A) which is mounted on the upper surface of unit 30. The supporting component (A) comprises a swing moving fulcrum (a) for plate 16. The right hand end of plate 16 is a fixed end (stationary or immobile) and the left hand end of the plate is free to move. Thus, the connected movable reflecting mirror 7 is also free to move, moving as part of an extended line of plate 16.

Referring to FIGS. 1, 2, 1B, 1C and 1D, when the vibration plate 16 is at its rest position and the direction of its free-end (the direction a tangent line) is set at zero degrees, the position (direction) of the movable reflecting mirror 7 is represented by an angle psi ($\psi$) which is smaller than 90 degrees. The angle psi ($\psi$) is determined by the positional relationship of the first stationary mirror 5 and second stationary mirror 8. In the embodiment of FIGS. 1 and 2, the angle psi ($\psi$) is set at 45 degrees.

The vibration plate 16 may be wholly, or partly, a piezoelectric transducer, not detailed in the figure, having a pair of electric drive terminals (E) located at the fixed end of the plate for, when appropriately powered, causing the vibration plate to move. When the plate 16 (e.g., the piezo-electric transducer) moves up and down and/or back and forth, swinging and/or rotating, the reflecting mirror 7 moves in a like manner since it is connected to plate 16.

The displacement (theta—$\theta$) representing the direction of the movable mirror 7 is determined by an angle phi ($\psi$) which is a function of the direction of the free end of the plate 16. The displacement theta ($\Theta$) is therefore a function of the angle phi ($\psi$) and the value of the angle psi ($\psi$) defining the rest position of the movable reflecting mirror.

Figure 3:
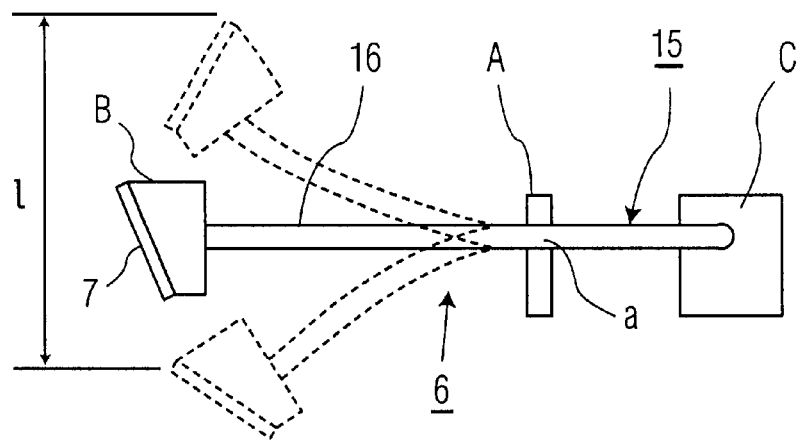
FIG. 3 is a representation of the movement of a movable mirror mounted on a vibrating arm in accordance with the invention.

Referring to FIG. 3 depicting the swing mirror assembly 6, it may be seen that the vibration plate 16 undergoes a bending vibration within perpendicular plane when a drive voltage, of, for instance, approximately 50V, is generated by a vibration plate drive circuit (E). As the vibration plate 16 undergoes bending while it swings back and forth, the reflecting mirror 7 is subjected to a rotational vibration centered about fulcrum (a) of the swing vibration. At this time, the center point of the movable reflecting mirror 7 vibrates toward the right and left directions and also up and down directions. The vibration range width of the up and down directions is designed to be in the range of 1 mm (upward 0.5 mm and downward 0.5 mm).

As noted above, the displacement (Θ) of the movable reflecting mirror 7 is determined by the direction of the free end of the vibration plate 1 superimposed on the stand still (rest position) angle psi of the movable reflecting mirror 7. The displacement is a function of the up and down vibration width L, and amplitude. The vibration mode of the vibration plate 16 is a bending vibration mode. Therefore, the angle of a tangent line of the free end is larger than the angle of the straight line between the free end and the center of the vibration. The changed position of the movable reflecting mirror 7, the angle change and the position change toward the light path, changes the reflective point on the optical pattern 4 along the vertical direction. When the changed position value of the movable reflecting mirror (7) is calculated into the value at the reflected point on the optical pattern 4, there will be a 10 mm change in position value along the vertical direction. In other words the height of the vertical direction, up and down direction, of a parallel type scan pattern will be 10 mm. For a total vertical value of 10 mm and setting the distance between scan lines adjacent to each other at 0.2 mm, the total number of scan lines will be 50 lines. Thus, scanning over 10 mm up and down can be read in one sweep or scan. In accordance with this embodiment of the invention, barcode information as well as such 2-dimensional information as letters, characters, etc. can also be read easily.

The operation of the system shown in FIGS. 1 and 2 may be initiated when a user of the reading apparatus (scanner) closes a switch (not shown) to apply an operating voltage to the various electronic and electrical components of the apparatus. The light source 2 is then energized and projects a light 12 onto the medium 3 on which an optical pattern is to be read. At the same time, the vibration plate 16 is driven by a vibration drive circuit (E) and begins to bend (flex) and vibrate cyclically from up to down and down to up. A user of the scanner can hold the rear portion of the housing 1, i.e. the hand-grip portion, and place the top end of the guide 11 in contact with the lower adjacent area of the optical pattern 4 to be read. Keeping the housing in contact with the medium 3 and the pattern 4, the hand-grip portion of the housing 1 may be adjusted by moving it up and down to illuminate the entire optical pattern 4 to produce equal brightness distribution across the optical pattern.

A portion of the light reflected from the optical pattern 4 passes through the light entrance-exit port of the housing 1, enters inside the housing, and is reflected by the fixed reflecting mirror 5 and is then projected onto movable reflecting mirror 7. The incident reflected light is then redirected in the horizontal direction via the movable reflecting mirror 7 and the second fixed reflecting mirror 8. Thus, the reflected light is projected via movable reflecting mirror 7 and the second fixed reflecting mirror 8 in repeated reflections in a zig-zag route (see FIG. 1C), and then moves horizontally via the light condensing optics onto the light condensing plane of the line image sensor 10. The position of the housing 1 is kept unchanged throughout a read cycle, even after the adjustment is completed and an instruction for reading is given through a switch, not shown. The timing of the function of a start is provided by a micro-computer.

Referring to FIGS. 1, 1B, 1C and 1D, there is shown, for purpose of illustration, 3 reflective light lines (13). The top light line 13a corresponds to the position and angle of the movable reflecting mirror 7 when the free end of the vibration plate 16 bends the most downward. The middle light line 13b corresponds to the position and angle of the movable reflecting mirror 7 when the free end of the vibration plate 16 is at a rest (standstill) position. The bottom light line 13c corresponds to the position and angle of the movable reflecting mirror 7 when the free end of vibration plate 16 bends the most upward.

Assume that the optical pattern 4 to be read is divided into 50 linear areas running sequentially from top to bottom, or vice-versa. The top light line 13a is reflected from the linear area crossing over the top end position of the optical pattern 4; hereinafter referred to as "the first linear area". The middle light line 13b is reflected from the linear area crossing over the center position of the optical pattern 4. The bottom light line 13c is reflected from the linear area crossing over the bottom end position of the optical pattern 4, for instance the 50th linear area.

When the reflected light from the first linear area is projected onto the light incident plane of the line image sensor 10, the light reflected at the same time from the adjacent areas is not projected onto the light plane of the image sensor 10.

When the light reflected from the linear area immediately below the first linear area, hereinafter referred to as the second linear area, is projected onto the linear light incident plane of the line image sensor 10, the reflected light emitted at the same time from the adjacent linear areas is not projected onto the linear light incident plane of the line image sensor 10. The reflected light from other linear areas function similarly. Therefore, a different position and a different angle of the movable reflecting mirror 7 correspond to a different linear area on the optical pattern 4. The 3 reflected light lines 13 are not projected onto the line image sensor 10 at the same time. As noted above, the vibration plate (arm or board) 16 undergoes cyclical bending and vibration, moving up and down and then down and up. While the mirror 7 vibrates back and forth, clock pulses are sent to the line image sensor 10, continuously or intermittently, such that many scan lines, for instance 50 scan lines, each parallel to the other, can be made to have nearly equal values on the optical pattern 4. Concurrently, an electric analog signal, corresponding to the photo-electrically converted incident light from the optical pattern, will be outputted at the output of the image sensor 10. The electric analog signal is converted by the signal processing circuitry into binary valued signals (2-element signal) and then stored in a next successive location of the frame-memory. When this occurs, "n" bits of binary-valued signals in a row, obtained by electronically scanning over a linear area "i", will be stored in a corresponding "ith" row of the frame-memory area.

Scanning can be commenced from any linear area, but it is needed to make clear from which point scanning commenced. Groups of stored binary-valued signals may be decoded by a decoding circuit to read and identify the information contained in the optical pattern. If the initial reading is not successful, the reading of the optical pattern continues until a successful read is obtained. Presently, the time required for a reading operation is approx. 200 ms in the embodiment shown in FIGS. 1 and 2. But with functional improvements in micro-computers and CCDs it can be substantially reduced to 40 ms, or less.

Figure 4:
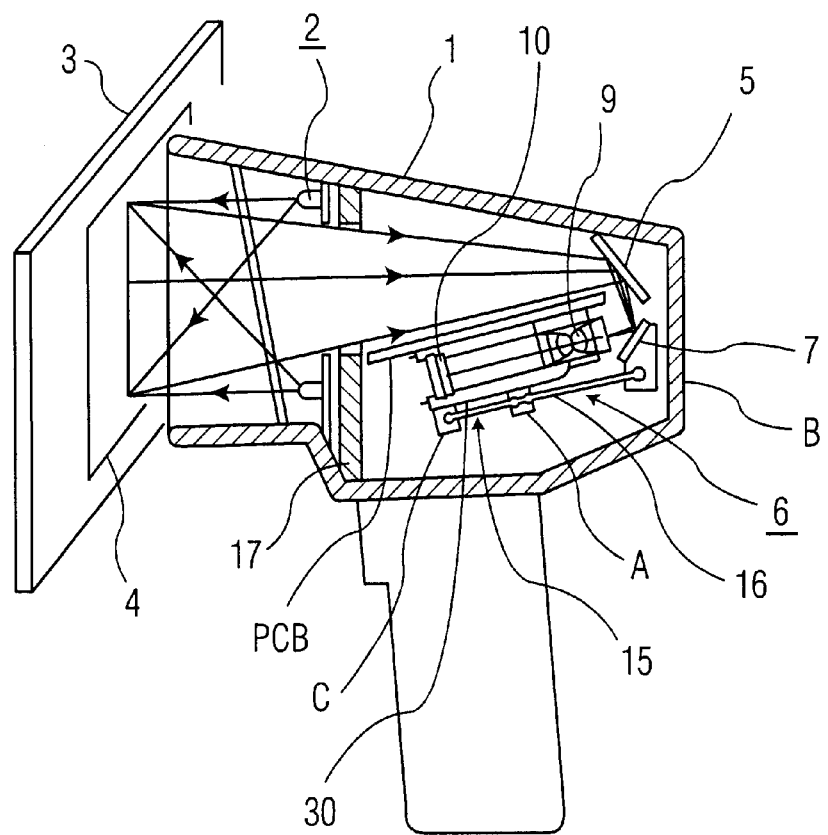
FIG. 4 is a cut away side view of another optical reading system embodying the invention.

FIG. 4 illustrates another optical pattern reading apparatus embodying the invention. The apparatus of FIG. 4 includes a housing 1, a light projection means (light source) 2, an object 3 containing an optical pattern 4 to be read, a fixed (stationary) reflecting mirror 5, a movable reflecting mirror 7, a light condensing optic assembly 9, an electronic scan type line image sensor 10, a swing movement drive means 15, a light shielding plate 17, and a unit case 30.

In FIG. 4, the housing 1 is shown to have a large area light entrance-exit port in front and considerable hollow space inside. A hand-grip portion is provided at the bottom of the housing. The light projection means 2 includes a plurality of individual light sources, such as LEDs, arranged inside the housing. The plural light sources, as illustrated, are arranged to be out of the way of the reflected light path. In this embodiment the projection of the light source 2 onto the pattern 4 along the vertical direction is much greater than for the embodiment shown in FIGS. 1 and 2.

In FIG. 4, the fixed reflecting mirror 5 is located near the upper rear interior area of the housing 1 and the direction of its normal line slants downward. Light reflected from the optical pattern 4 onto reflecting mirror 5 is re-reflected at an obtuse angle and directed downward onto movable reflecting mirror 7, located below reflecting mirror 5, with the direction of the normal line of mirror 7 slanting upward. Light reflected from the fixed reflecting mirror 5 is reflected and directed towards mirror 7 at a downward angle.

As in the embodiment of FIGS. 1 and 2, the light condensing optic assembly 9 may be located at the input end of a unit case 30, and the line image sensor 10 is located at the far end inside unit case 30. The light condensing optic elements 9, the linear image sensor 10 and the holding case 30 are arranged such that the light reflected from the fixed mirror 5 onto movable mirror 7 is reflected by mirror 7 in a slightly downward direction relative to the horizontal. The light reflected from movable reflecting mirror is projected onto the linear light incident plane of the line image sensor 10 through the light condensing optic 9. In FIG. 4, one end (e.g., the left-hand side) of the vibration plate is fixed onto the bottom side (the lower side) of the bottom plate of the unit case 30 by a fixing component (c), and the other end (e.g., the right-hand side) is connected to the movable reflecting mirror 7 by a bracket (B). The standstill (rest) position of the movable reflecting mirror 7 is, as illustrated, at a point away from the vibration plate 16 and its extended line. A support (A) for the vibration plate is located at the lower side of the bottom plate of unit case 30 in correspondence to the adjacent area of the fixed end of the vibration plate 16. The support (A) comprises a swing movement fulcrum (a) for the vibration plate (16). Thus, one end, left, of the vibration plate (16) will be a fixed end and the other end, right, will be a free end, capable of moving. The movable reflecting mirror 7 connected to the right free end is thus free to move as well.

If a tangent line direction of the free end at the rest position of the vibration plate 16 is at an angle theta (Θ) relative to the direction of the movable reflecting mirror 7, a normal line direction, is shown by an angle psi, where psi is greater than 90 degrees and less than 180 degrees. The angle psi (ψ) is determined by and in relation to the position of the fixed reflecting mirror 5 and the light, condensing Optic 9. In this embodiment, for instance, it may be set at 135 degrees.

In FIG. 4, a printed circuit board, PCB, is placed on top of unit case 30. The width of an electronic scan along the vertical direction over an optical pattern is greatly enlarged over that shown in the embodiment of FIGS. 1 and 2. For instance, it is enlarged up to 4 times (40 mm). Accordingly , scan lines may be increased up to 4 times (200 lines). This ensures a larger usage enabling many lines of words at one time in case of reading words.

The scanner shown in FIG. 4 may be used in an upside down manner relative to the way it is illustrated in FIG. 4. In such a case the hand-grip portion would be located on the opposite side to the way it is shown in FIG. 4. The scanning operation of the scanner of FIG. 4 and the back and forth swinging movement of the mirror is otherwise similar to the operation described for FIGS. 1 and 2.

Figure 5:
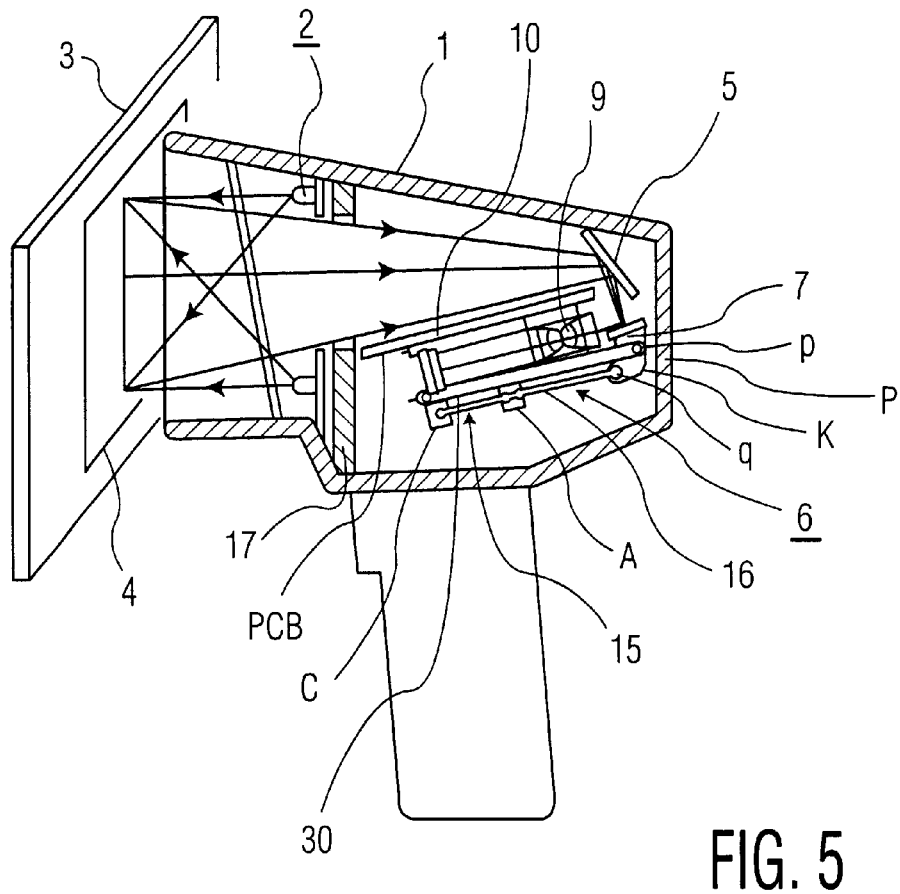
FIG. 5 is side view of still another optical reader embodying the invention.

FIG. 5 shows an embodiment of the invention which employs a bell crank (K) inserted between the vibration plate 16 and the movable reflecting mirror 7. This enables the driving power to be less than for the embodiment shown in FIG. 4, and also enables the vibration plate 16 to be made lighter in weight.

The scanning apparatus of FIG. 5 includes a housing 1, a light projection means 2, a reading component 3, an optical pattern 4, a fixed reflecting mirror 5, a movable reflecting mirror 7, a light condensing optic assembly 9, an electronic scan type line image sensor 10, a swing drive means 15, a shielding plate 17 and a unit case 30. The light condensing optic assembly 9 may be the same as in the embodiment of FIG. 4, and may be located at the front end (gate) of unit case 30. The line image sensor 10 is located at the far internal end of unit case 30. Thus, light is reflected from the movable reflecting mirror 7 via optical assembly 9 and unit case 30 onto line image sensor 10 in a slightly downward direction relative to the horizontal direction.

In the embodiment of FIG. 5, one end of the vibration plate (the left-hand side) is held below the lower plane of the bottom plate of unit case 30 by a fixing component (C). The other end (right-hand side) is connected to the movable reflecting mirror 7 by a bell crank (K). A vibration plate support (A) is arranged below the lower plane of the bottom plate of unit case 30 in correspondence to near to the fixed end of the vibration plate 16. The vibration plate support (A) functions as a fulcrum (a) of the swing movement for the vibration plate 16. The left end of the vibration plate 16 will thus be a fixed (stationary) end and the right end will be a free end. Accordingly the movable reflecting mirror connected to the right end will also be at the free end and can move freely. The bell crank (K) is, as generally known, comprised of 2 arms crossing each other almost at a right angle at a main shaft (p). The main shaft (p) is supported in free revolving by a bearing on a bell crank support (P) which protrudes from the bottom plate of unit case 30. One end (a lower arm) of the bell crank (K) is connected to the free end of the flexible vibration plate 16 through a pairing shaft (q) and the other end (an upper arm) is connected to the back side of the movable reflecting mirror (7).

In the embodiment shown in FIG. 5, the standstill (rest) position of the movable reflecting mirror 7 is at a position away from the vibration plate 16 or its extended line. If a direction of the free end, the direction of a tangent to the line, is zero degrees, the direction of the movable reflecting mirror 7, the direction of a normal line, is an angle psi, where psi is greater than 90 degrees and less than 180 degrees. The angle psi is determined relative to a position of the fixed reflecting mirror 5 and light condensing optics 9. For example, in this embodiment it is set at 135 degree.

In this embodiment since movable reflecting mirror 7 is supported by a bearing on the bell crank support (P) the weight of the movable reflecting mirror 7 applied onto the vibration plate (16) is reduced, and the driving power of the vibration plate (16) need not be as high as for FIG. 4, enabling the vibration plate 16 to be made smaller in size and lighter in weight.

The position of the components illustrated in FIG. 5 may be inverted from up to down and down to up. In such case, the hand-grip portion may be arranged to a position opposite to that illustrated in FIG. 5. All other descriptions are same as for the embodiment shown in FIG. 4.

Figure 6A:
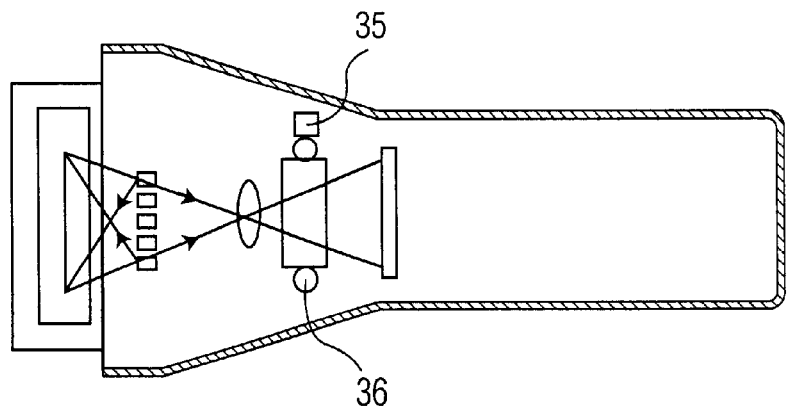
FIG. 6(*a*) is a cut away top view of still another optical reader embodying the invention.
Figure 6B:
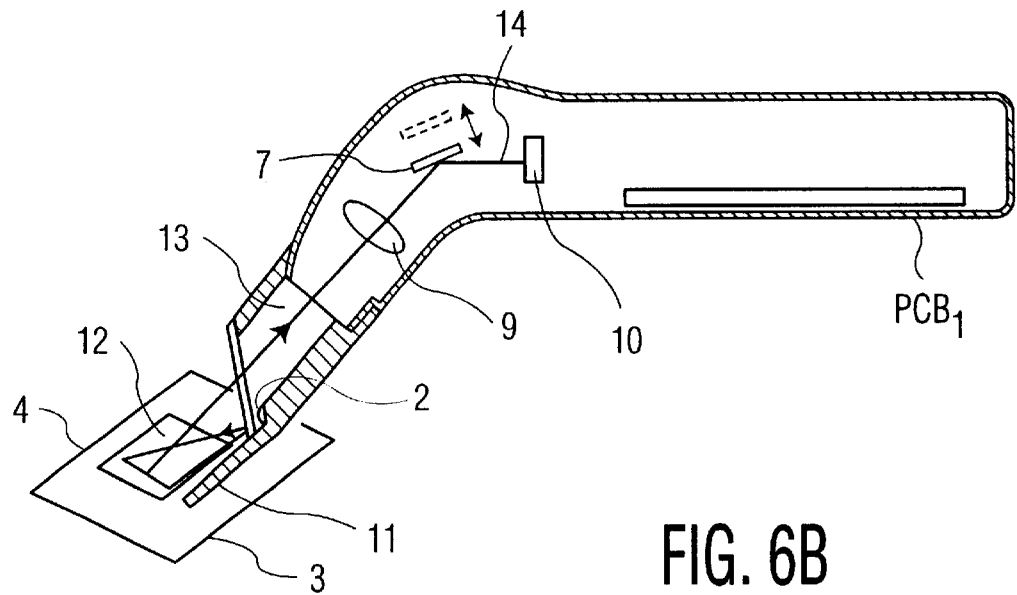
Figure 7:
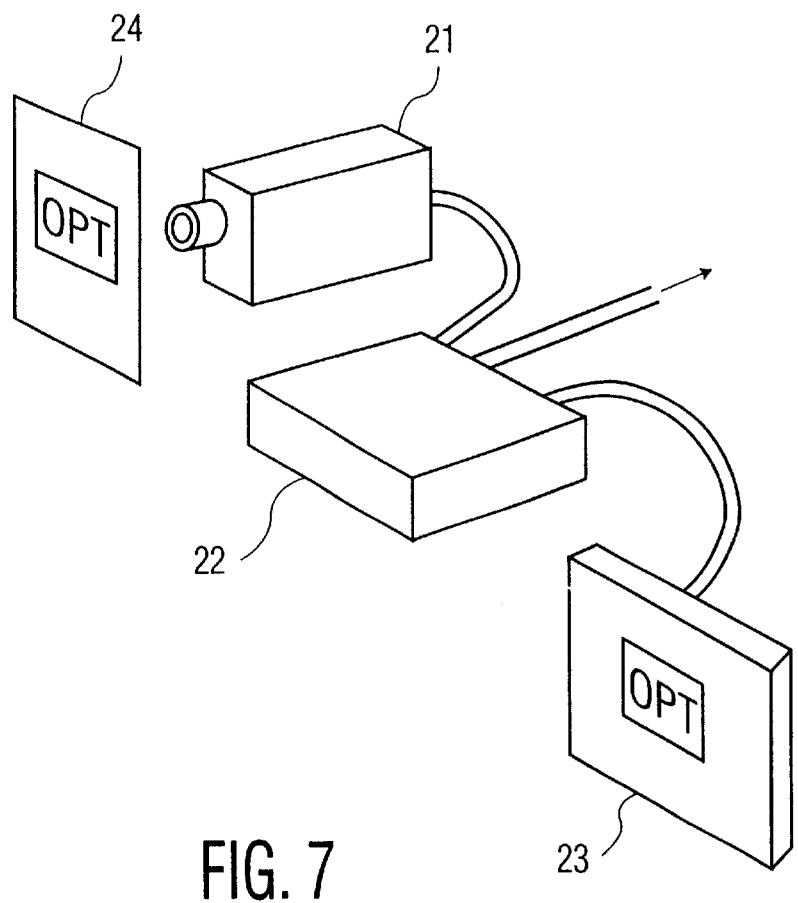
FIG. 7 is a diagram of a prior art system.

FIGS. 6(a) and 6(b) illustrate another optical pattern reading apparatus of this invention. FIG. 6a is a cut away top view and FIG. 6(b) is a cross section view of the apparatus. The apparatus includes a housing 1, a light projection means 2, a medium 3 containing an optical pattern 4 to be read, a movable reflecting mirror 7, a light condensing optic assembly 9, an electronic scan type line image sensor 10, a vibration drive means 35, and a drive shaft 36. FIG. 6 also shows light 12 being projected, a reflected light ray 13 and a re-reflected light ray 14.

As illustrated in FIG. 6(a), the housing (1) has a light entrance-exit port at its top end and a hollow space inside, and is shaped to be wider in the front half area and rectangular in the rear half area. As illustrated in FIG. 6(b), the housing 1 has an horizontal rear section and a front section extending at a downward obtuse angle relative to the horizontal. The movable reflecting mirror 7 is located inside the housing 1 near the bend point inside the housing (1) and, as indicated by a double headed arrow in FIG. 6(b), it vibrates up and down and back and forth along the direction of its normal line.

The drive shaft 36 shown in FIG. 6a is so fixedly arranged that the direction of its normal line is in parallel relation with both right and left end of the movable reflecting mirror 7. The vibration drive means 35 is comprised of a rotational electric and mechanical conversion system such as a galvanic motor, and connected to the drive shaft 36 through a converting mechanism from a rotational movement to a linear movement such as a rack and pinion.

The light condensing optic assembly 9 is arranged at a suitable point between the light entrance-exit port and the movable reflecting mirror 7, and focuses a reflected light from a line area on the optical pattern 4 to a predetermined position along the direction of the movable reflecting mirror 7.

When the vibration drive means 35 begins to vibrate, the movable reflecting mirror 7 is driven via the drive shaft 36 so as to move back and forth along the double headed arrow path shown in FIG. 6(b). When the movable reflecting mirror 7 is positioned along the solid line of FIG. 6(b) only the reflected light from the linear area crossing horizontally around the center of an optical pattern to be read is projected onto the light condensing plane of the line image sensor 10 after passing through an aperture of the light condensing optic assembly 9 and being reflected by the movable reflecting mirror 7 positioned at the solid line. For this position, light reflected from other linear areas adjacent to the center linear area is not projected onto the light condensing plane of the line image sensor 10. When the movable reflecting mirror is positioned at the dotted line of FIG. 6(b) only the light reflected from the linear area crossing horizontally over the lower end of the optical pattern is projected onto the light condensing plane of the line image sensor 10. That is, light reflected from the lower end of the optical pattern passes through an aperture of the light condensing optic 9 and is reflected by the movable reflecting mirror 7 positioned at the dotted line onto the linear image sensor 10. For this position, the light reflected light from adjacent linear areas, other than the lower linear area, is not projected onto the light condensing plane of the line image sensor 10.

When the movable reflecting mirror 7 is at the opposite symmetric position of the dotted line of FIG. 6(b) only the light reflected from the linear area crossing horizontally over the upper (top) end of the optical pattern is projected via the aperture of light condensing optic 9 and the movable reflecting mirror 7 onto the light condensing plane of the line image sensor (10)). For this position light reflected from linear areas, other than the upper end, is not projected onto the light condensing plane of the line image sensor 10.

When the movable reflecting mirror 7 is positioned at a predetermined position between the solid line and the dotted line only the light reflected from the reflected light of a specific linear area positioned between said two linear areas on the optical pattern 4 is projected onto the line image sensor 10. At all times, the light reflected from adjacent areas of the pattern to be read, other than the specific linear area, is not projected onto and does not reach the image sensor (10)). As already stated, each different position of the movable reflecting mirror 7 corresponds one to one to a different linear area of the optical pattern to be read. The operation of the apparatus of FIGS. 6(a) and 6(b) is otherwise similar to that described above for the other embodiments.

The vibration drive means 35, the rotational electric and mechanical conversion system, and the drive shaft 36 discussed in FIGS. 6a and 6b may be replaced with a movable part of a linear type electric and mechanical conversion system connected to both ends of the movable reflecting mirror 7. The linear type electric and mechanical conversion system is known as a movable iron-core electric and mechanical converter comprising a movable iron-core and fixed line link, and also same comprising a movable iron-core and movable line link. In such an embodiment, in order to smooth out the vibration movement a resilient material such as a pressure and extension coil spring may be provided between the two ends of the movable reflecting mirror and the housing 1, and/or between the movable reflecting mirror 7 and the top wall of the housing 1. The vibration drive means of this embodiment may be smaller in size and lighter in weight than those of the embodiment shown in FIGS. 6a and 6b.

NUMBERS & SYMBOLS IN DRAWINGS

1 Housing
2 Light projection means (light source)
3 Reading object
4 Optical pattern to be read
5 Fixed reflective mirror
6 Swing moving mirror means
7 Movable reflecting mirror
8 2nd fixed reflecting mirror
9 Light condensing (collecting) optic
10 Line image sensor
11 Guide to determine location or position
12 Projection light
13 Reflected light
14 Re-reflected light
15 Swing drive means
16 Vibration plate
17 Light shielding plate
21 TV camera
22 Image processing means
23 TV monitor
24 Label
30 Unit case
35 Vibration drive means
36 Drive shaft
a Swing moving fulcrum
P Main shaft
q Pairing shaft
A Vibration plate support
B Bracket
C Fix component D Cable
E Vibration plate drive circuit
K Bell crank
P Bell crank support

What is claimed is:

1. An optical reading apparatus comprising:
   a housing having a port for allowing light to be projected from within the housing onto a pattern to be read and for enabling light reflected from the pattern to pass through and into the housing;
   light projection means located within the housing arranged for projecting light and simultaneously illuminating an area on a pattern located externally to the housing, whereby light is reflected from the entire illuminated area of the pattern at the same time;
   a first stationary mirror located within the housing for receiving the entire illuminated light pattern reflected from the illuminated area, at the same time;
   a linear, one dimensional image sensor mounted within the housing; and
   a movable reflecting means located within the housing for sequentially scanning narrow rectangular portions of the light reflected onto said first mirror and sequentially projecting these different narrow rectangular portions of the reflected pattern from said first mirror onto said image sensor for sequentially projecting the light reflected from the entire illuminated area of the pattern onto the image sensor.

2. An optical reading apparatus as claimed in claim 1, wherein said one dimensional image sensor is a solid state sensor.

3. An optical reading apparatus as claimed in claim 2, wherein said solid state sensor is a charge coupled device (CCD) having all its elements formed along one row.

4. An optical reading apparatus as claimed in claim 1, wherein said movable reflecting means includes a vibrating mirror and optical means arranged to sweep across the light image reflected from the pattern onto the first mirror and for translating the reflected light image and sequentially projecting narrow rectangular portions of the reflected pattern onto the image sensor.

5. An optical reading apparatus as claimed in claim 4, wherein said movable reflecting means includes a plate having one end which is fixed so as not to vibrate and having another end which is free to vibrate, and wherein said vibrating mirror is attached to the free end of the plate; and
   wherein said movable reflecting means includes means for driving the plate and causing it to vibrate in a plane which is perpendicular to the direction in which the plate extends.

6. An optical reading apparatus comprising;
   a portable, light weight, hand held housing having a light entrance-exit port for allowing light to be projected from within the housing and for reflected light to pass through;
   a source of light and light projection means within the housing for projecting light onto an entire two-dimensional pattern and for simultaneously illuminating the entire area of the pattern, whose contents are to be read, where the pattern is located externally to the housing and whereby the projected light is reflected form the entire illuminated area of the pattern towards the light entrance-exit port at the same time;
   a first stationary mirror for receiving the illuminated pattern;
   a vibration plate located within said housing having one end which is fixed and having another end which is free to move and vibrate back and forth;
   a drive means coupled to said vibration plate for causing it to move back and forth;
   a reflecting mirror connected to the free end of the vibration plate so as to follow the back and forth movement of said vibration plate;
   an electronic scan type line image sensor located within the housing;
   a light collecting optic arrangement for sequentially scanning narrow rectangular portions of the entire illuminated area present on said first mirror and imaging the narrow rectangular portions of said pattern by means of said reflecting mirror onto said line image sensor, where each one of the narrow rectangular portions are substantially smaller than the entire illuminated area of the pattern;
   a signal processing circuit connected to the output of said line image sensor; and
   a memory and a decoding circuit connected to the output of said signal processing circuit.

7. An optical reading apparatus as claimed in claim 6 wherein said light projection means includes a plurality of light sources arranged in a loop to illuminate the optical pattern without interfering with the light reflected from the optical pattern intended to be projected onto said line image sensor.

8. An optical reading apparatus as claimed in claim 6 wherein a first stationary mirror is located with said housing for reflecting the light from said pattern onto said movable reflecting mirror, which then projects the reflected light onto said image sensor.

9. An optical reading apparatus as claimed in claim 8 wherein said movable reflecting mirror sequentially reflects different segments of the reflected optical pattern onto a second stationary mirror located within said housing, said second stationary reflecting mirror projecting the light it receives onto said line image sensor.

10. An optical reading apparatus as claimed in claim 8 wherein said housing includes a second stationary reflecting mirror located in the reflecting direction of said movable reflecting mirror and a light condensing optic assembly for directing the reflected light from said movable reflecting mirror via said light condensing optic assembly onto said line image sensor.

11. An optical reading apparatus as claimed in claim 6 wherein said vibration plate includes a piezoelectric resonator.

12. An optical pattern reading apparatus as claimed in claim 6, wherein the housing includes a guide arm to locate the area of the optical pattern to be read; wherein the guard arm is formed in the front of the housing in order to correctly and steadily position the housing and in order to have the light projected from said light projection means projected correctly and firmly towards said optical pattern, and also in order to have parallel line scan patterns composed on said optical pattern in equal stabilized segments.

13. An optical reading apparatus as claimed in claim 6 wherein said light projection means comprises a plurality of light sources.

14. An optical pattern reading apparatus comprising:
   a light entrance-exit port at one end of the apparatus for allowing the projection of light from within the apparatus and the reflection of light into the apparatus;
   a light projection means located within the apparatus for projecting light onto a pattern located externally to the apparatus for simultaneously illuminating a relatively large two dimensional portion of said pattern and whereby light is reflected form the entire illuminated area of the pattern at the same time;

a first fixed reflecting mirror located within the apparatus for receiving and reflecting light reflected from said optical pattern;

a vibration plate having one end held stationary and having another end which is free to vibrate;

drive means coupled to said vibration plate for causing it to vibrate;

a movable reflecting mirror connected to the free end of said vibration plate for moving back and forth in the same manner as the free end of the vibration plate; said movable reflecting mirror for reflecting the reflected light it receives from said fixed reflecting mirror; and a light condensing optic assembly for imaging the light reflected from said movable reflective mirror onto a linear image sensor of an electronic scan type.

15. The optical pattern reading apparatus of claim 14 wherein a signal processing circuit is connected to the output of said line image sensor; and wherein a memory and a decode circuit are connected to the output of said signal processing circuit.

16. An optical pattern reading apparatus comprising;

a housing having a light entrance-exit port at one end for allowing the projection light from within the apparatus and the reflection of light into the housing;

a light projection means located within the apparatus for projecting light onto an optical pattern located externally to the apparatus;

a first reflecting mirror located within the housing for reflecting light reflected from said optical pattern;

a vibration plate having one end held fixed and having another end which is free to move;

drive means coupled to said vibration plate for selectively causing it to vibrate;

a movable reflecting mirror connected to the free end of said vibration plate through a bell crank for causing the mirror to vibrate in the same manner as the vibration plate; and said movable reflecting mirror for reflecting light reflected from said first fixed reflecting mirror via a light condensing optic assembly onto a line image sensor of an electronic scan type.

17. An optical pattern reading apparatus as claimed in claim 16, wherein a signal processing circuit is connected to the output of said line image sensor; and wherein a memory and a decode circuit are connected to the output of said signal processing circuit.

18. An optical pattern reading apparatus comprising;

a portable, light weigh, hand held housing having a light entrance-exit port for allowing a projection light and a reflected light to pass through, and having a hollow room inside, and shaped such that it has a generally rectangular rear portion which is horizontal and a front portion which extends at a generally obtuse angle relative to the horizontal portion;

a light source and a light projection means located within the housing for projecting light onto a two-dimensional pattern external to the housing for simultaneously illuminating a substantial two dimensional portion of said pattern and whereby light is reflected form the entire illuminated area of the pattern at the same time;

a light condensing optic assembly located within the housing for capturing light reflected from the entire illuminated area and imaging the light reflected from said pattern onto a reflecting mirror located within said housing;

means coupled to said reflecting mirror for causing it to move and vibrate so as to sweep sequentially across the light reflected from the pattern and projected onto its surface; said reflecting mirror projecting narrow rectangular light image segments onto a line image sensor of an electronic scan type;

a signal processing circuit connected to the output terminal of said line image sensor; and a memory and decode circuit connected to the output of said signal processing circuit.

19. An optical pattern reading apparatus as claimed in claim 18 wherein the housing includes a guide arm to locate the pattern to be read; wherein the guide arm is connected to the front of said housing to enable correct and stable light projection from said light projection means onto said optical pattern and also for stabilizing a parallel line scan pattern on said optical pattern.

20. An optical pattern reading apparatus as claimed in claim 19 wherein said line image sensor is a linear array of solid state elements.

* * * * *